Patented Oct. 22, 1940

2,218,661

UNITED STATES PATENT OFFICE 2,218,661

AGE RESISTOR

Waldo L. Semon, Silver Lake, Ohio, assignor to The B. F. Goodrich Company, New York, N. Y., a corporation of New York No Drawing. Application September 16, 1937, Serial No. 164,199

14 Claims. (Cl. 260—802)

This invention relates to the art of rubber manufacture and has as its chief object the preparation of a new class of age resistors for rubber and other oxidizable materials such as gasoline, linseed oil, rosin, turpentine, aldehydes, etc.

It is well known that the deterioration of rubber and many other organic materials is due to various influences such as the action of atmospheric oxygen, light and heat. In the case of rubber articles, deterioration is frequently accelerated by stretching, repeated flexing and by other types of mechanical action. It is also well known that certain diarylamines as well as the reaction products of diarylamines with ketones or with aldehydes are useful for retarding this type of deterioration or fatigue.

The new class of age resistors that I have discovered may be defined as consisting of the reduced reaction products of diarylamines and ketones, and the reduced reaction products of diarylamines and aldehydes. The reaction product of the diarylamine and the carbonyl compound can be prepared by using equivalent moles of the reactants or by using an excess of either in widely varying amounts. It can be prepared at suitable temperatures varying from 0° C. to 300° C. in the presence of suitable catalysts such as $I_2$, HCl, $H_2SO_4$, $H_3PO_4$, $AlCl_3$, $ZnCl_2$, $BF_3$, etc. In some cases the catalyst should be used in high concentration such as one mole of catalyst for each mole of diarylamine. It may or may not be necessary to agitate the reacting mixture.

As examples of diarylamines that may be employed, the following may be given: diphenylamine, phenyl-beta-naphthylamine, phenyl-alpha-naphthylamine, di-beta-naphthylamine, N,N'-diphenyl-p-phenylenediamine, di-beta-naphthyl-p-phenylenediamine, phenyl p-tolylamine, the ditolylamines, phenyl p-cumylamine, phenyl p-xenylamine, p-isopropoxydiphenylamine, p,p'-dimethoxydiphenylamine, p-hydroxydiphenylamine, p-aminodiphenylamine, and p-chlorodiphenylamine.

As examples of the carbonyl compounds that may be used, the following may be cited: acetone, mesityl oxide, methyl ethyl ketone, methyl isobutyl ketone, di-isopropyl ketone, cyclohexanone, benzophenone, acetophenone, formaldehyde, acetaldehyde, butyraldehyde, benzaldehyde, aldol and acrolein.

Generally speaking, the reaction products of diarylamines and ketones or aldehydes that have thus far been prepared and used are complex mixtures of compounds of uncertain structure. They vary from oils to high melting solids so far as their physical properties are concerned. Some of them are difficultly soluble in the substances that are used to protect. Many of them are dark in color and some have disagreeable odors. Upon reduction they are in general changed to materials of light color and mild pleasant odor, easily soluble in rubber, oils and the like, and having a very high activity as age-resisters or antioxidants, usually much higher than that of the original reaction products.

The reduction of the above described reaction products may be conducted in various ways such as by sodium-alcohol reduction or by catalytic hydrogenation. The physical properties and age resisting activity of the reduced product will depend on such factors as: the amount of hydrogen reacted, the hydrogenation catalyst, the temperature of reduction, the solvent, etc. Where it is desired to remove color of a reaction product or to remove a disagreeable odor, only a small amount of reduction is necessary in most cases. In other instances where the physical and chemical properties must be more profoundly modified, a greater amount of hydrogen can be absorbed.

As a specific example, a dark colored reaction product was prepared by heating for 2½ hours at 260° C. four moles of diphenylamine with one mole of acetone in the presence of 0.75 mole of concentrated hydrochloric acid. The hydrochloric acid was then washed out with dilute alkali and water and the excess diphenylamine was removed by distillation. A 240 g. sample of the product was shaken for four hours with 25 g. nickel catalyst in an autoclave with hydrogen at a pressure of 2700 to 2900 lbs. per sq. in. and at a temperature of 200 to 250° C. A small amount of hydrogen was absorbed. The product was removed from the autoclave by adding benzene. The benzene solution was filtered in order to remove the catalyst. The solvent was evaporated. The product was a thin crystalline paste of light yellow color apparently free from tar. It had a pleasing odor and was apparently free of acridines. One part of this material was added to a rubber stock having the following composition:

| | |
|---|---|
| Rubber | 100.0 |
| Accelerator | .6 |
| Sulfur | 3.0 |
| Zinc oxide | 5.0 |
| Gas black | 50.0 |
| Softener | 4.5 |

Tensile strength measurements were then made on samples of the stock cured under the same conditions and then aged for 48 hours at 70° C. under an oxygen pressure of 300 lbs. per sq. in. before determining the tensile strength. It was thus found that a loss of 45 per cent of the original tensile strength took place during aging. The same stock without age resistor suffered a loss of 87 per cent of its tensile strength under the same conditions. It was found that the stock containing the new age resistor showed a remarkable resistance to cracking when samples were flexed repeatedly.

As a further example a reaction product of phenyl-beta-naphthylamine and acetone was reduced in the same apparatus. A temperature of 150° to 160° C. was sufficient to bring about an appreciable absorption of hydrogen. The product had high age resisting activity. Similar results may be obtained by substituting the reaction product of phenyl-beta-naphthylamine with formaldehyde, or indeed by substituting any of the other reaction products referred to above.

The age resistors included in this invention vary widely in their activity and in other properties such as hydrogen content, staining properties, viscosity, etc. In general, those reaction products prepared from the naphthylamines will take up more hydrogen than those prepared from diarylamines not containing naphthalene groups.

While I have disclosed in considerable detail certain preferred methods of conducting my invention, I do not wish to be bound solely thereto since the exact proportions of the materials utilized may be varied widely without departing from the spirit and scope of the invention as defined in the appended claims.

I claim:

1. The method of retarding the deterioration of rubber which comprises treating rubber with a hydrogenated reaction product of a diarylamine with a carbonyl compound selected from the class consisting of aldehydes and ketones.

2. The method of retarding the deterioration of rubber which comprises treating rubber with a hydrogenated reaction product of a diarylamine with a ketone.

3. The method of retarding the deterioration of rubber which comprises treating rubber with a hydrogenated reaction product of a diarylamine with an aldehyde.

4. The method of retarding the deterioration of rubber which comprises treating rubber with a hydrogenated reaction product of diphenylamine and acetone.

5. The method of retarding the deterioration of rubber which comprises treating rubber with a hydrogenated reaction product of phenyl-beta-naphthylamine and acetone.

6. The method of retarding the deterioration of rubber which comprises treating rubber with a hydrogenated reaction product of formaldehyde and phenyl-beta-naphthylamine.

7. The method of retarding the deterioration of rubber which comprises treating rubber with a hydrogenated reaction product of acetone and a diarylamine containing at least one naphthyl group.

8. The method of retarding the deterioration of rubber which comprises treating rubber with a hydrogenated reaction product of a ketone and a diarylamine containing at least one phenyl group.

9. A rubber composition comprising rubber and a hydrogenated reaction product of a diarylamine and a carbonyl compound selected from the class consisting of aldehydes and ketones.

10. A rubber composition comprising rubber and a hydrogenated reaction product of a diarylamine and a ketone.

11. A rubber composition comprising rubber and a hydrogenated reaction product of a diarylamine and an aldehyde.

12. A rubber composition comprising rubber and a hydrogenated reaction product of diphenylamine and acetone.

13. A rubber composition comprising rubber and a hydrogenated reaction product of acetone and phenyl-beta-naphthylamine.

14. A rubber composition comprising rubber and a hydrogenated reaction product of formaldehyde and phenyl-beta-naphthylamine.

WALDO L. SEMON.